United States Patent
Moritani

(10) Patent No.: US 7,652,959 B2
(45) Date of Patent: Jan. 26, 2010

(54) OPTICAL DISK DEVICE

(75) Inventor: Shuji Moritani, Daito (JP)

(73) Assignee: Funai Electric Co., Ltd., Osaka (JP)

(*) Notice: Subject to any disclaimer, the term of this patent is extended or adjusted under 35 U.S.C. 154(b) by 549 days.

(21) Appl. No.: 11/519,067

(22) Filed: Sep. 12, 2006

(65) Prior Publication Data

US 2007/0058513 A1 Mar. 15, 2007

(30) Foreign Application Priority Data

Sep. 13, 2005 (JP) ............................. 2005-265394

(51) Int. Cl.
G11B 7/00 (2006.01)

(52) U.S. Cl. .................................................. 369/47.13

(58) Field of Classification Search ................ 369/47.1, 369/30.19, 30.22, 30.23, 47.13
See application file for complete search history.

(56) References Cited

U.S. PATENT DOCUMENTS

2006/0126460 A1* 6/2006 Kobayashi ................. 369/47.1
2007/0274175 A1* 11/2007 Hwang et al. .............. 369/47.1

FOREIGN PATENT DOCUMENTS

| JP | 05265784 | 10/1993 |
|----|----------|---------|
| JP | 2001-160268 | 6/2001 |
| JP | 2002185921 | 6/2002 |
| JP | 2003-274363 | 9/2003 |

OTHER PUBLICATIONS

Japanese Office Action issued in related application dated Mar. 3, 2008, 4 pages (including English translation).

* cited by examiner

Primary Examiner—Wayne R Young
Assistant Examiner—Brenda Bernardi
(74) Attorney, Agent, or Firm—Pillsbury Winthrop Shaw Pittman, LLP

(57) ABSTRACT

An optical disk device includes a BE control means which issues a request for recording of data upon an optical disk. Furthermore, this optical disk device includes an FE processing means which, upon receipt of the recording request from the BE control means, irradiates laser light from a pickup head onto the optical disk, and records data stored in a buffer RAM upon the optical disk. If an error has occurred during the recording of the data upon the optical disk by the FE processing means, then the BE control means first acquires, from the FE processing means, error information including an error occurrence address. And the BE control means performs control to execute recovery processing, according to this error information.

3 Claims, 5 Drawing Sheets

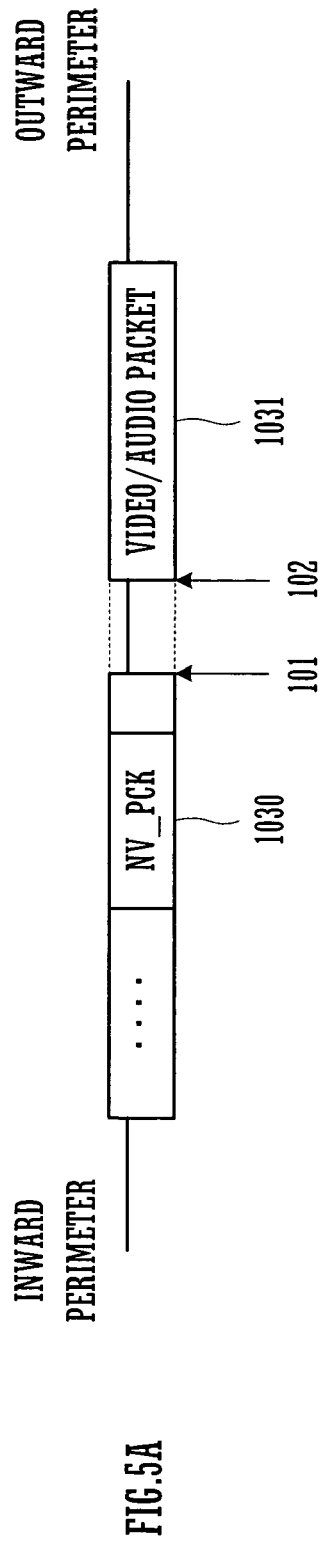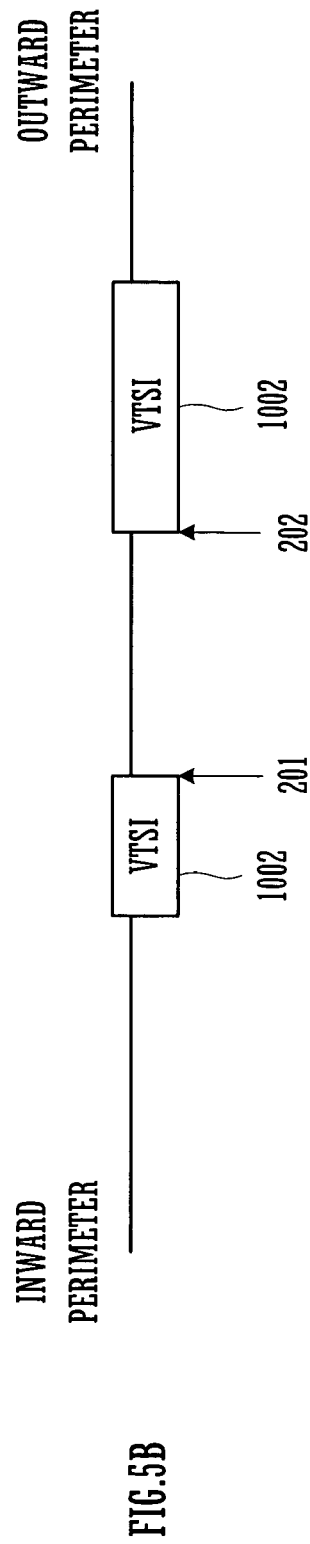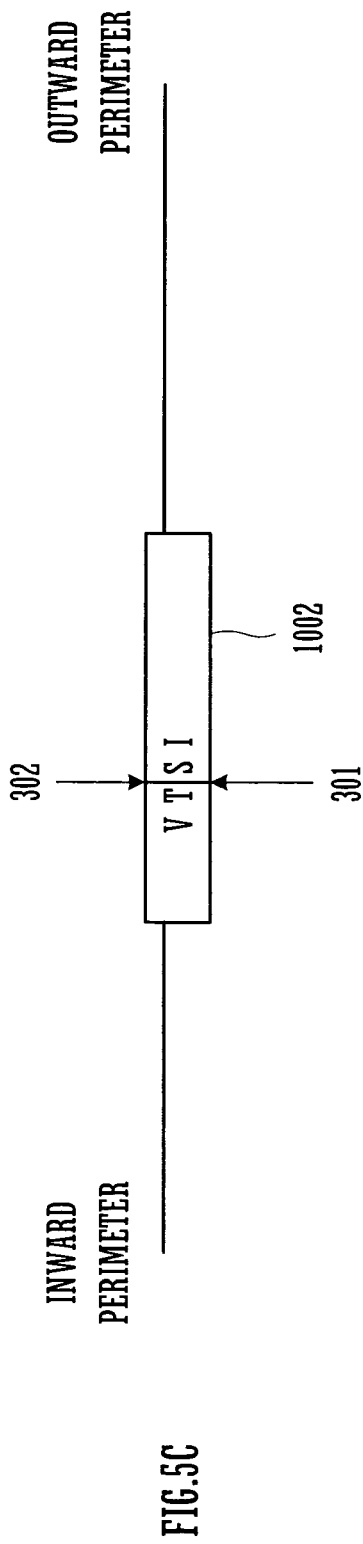

OPTICAL DISK DEVICE

CROSS REFERENCE

This Nonprovisional application claims priority under 35 U.S.C. §119(a) on Patent Application No. 2005-265394 filed in Japan on Sep. 13, 2005, the entire contents of which are hereby incorporated by reference.

BACKGROUND OF THE INVENTION

The present invention relates to an optical disk device which records data upon an optical disk such as a DVD (Digital Versatile Disk) or a CD (Compact Disk) or the like.

In the prior art, an optical disk device which irradiates laser light from a pickup head upon an optical disk, and which thereby performs recording of data such as images or voice or the like (image recording or sound recording), has been implemented and is generally known.

A prior art optical disk device comprises a front end (hereinafter termed "FE") side processing section which performs recording and so on of data such as images or voice or the like upon an optical disk, an FE control unit which controls this FE side processing section, a back end (hereinafter termed "BE") side processing section which outputs this data as a replay signal to the exterior of the device main body, and a BE control unit which controls this BE side processing section. A buffer memory and the above described pickup head are included in this FE side processing section.

With such a prior art optical disk device, if an error occurs while the FE side processing section is recording data upon the optical disk, recovery processing is executed according to an error code. In more detail, when this error occurs, first, the BE control unit transmits a confirmation command to the FE control unit, which confirms what type of error has occurred. Next, upon receipt of this confirmation command, the FE control unit transmits an error code to the BE control unit. Finally, the BE control unit executes recovery processing according to the error code, and restarts the recording.

In this procedure, the above described error code is a code which indicates the type of error which has occurred. Furthermore, the above described error brings about a state in which servo control cannot be performed in a normal manner, since damage or dirt or the like is present upon the recording surface of the optical disk. Moreover, by the above described recovery processing, is meant processing for rescuing an optical disk, even if an error has occurred during recording upon that optical disk, so as not immediately to make that optical disk into an optical disk which cannot be used. In concrete terms, by the above described recovery processing, is meant processing for commanding the FE processing means to determine a re-recording address upon the optical disk and a method of re-recording upon the optical disk, and to perform re-recording of the data, based upon this re-recording address and this re-recording method. With prior art optical disk devices, after this recovery processing, recording is recommenced if the recovery processing has succeeded.

On the other hand, a hard disk drive (HDD) of the type described in Japanese Laid-Open Patent Publication 2001-160268 has been proposed.

However, with the above described prior art examples, a buffer memory is provided to the FE side processing section. Because of this, a discrepancy may occur between the address of the data which the BE control unit requests the FE control unit to record, and the address of the data which is actually recorded by the FE side processing section, due to the amount of delay imposed by the buffer memory. With a prior art optical disk device, because of this discrepancy, if an error has occurred, the BE control unit is not able accurately to ascertain up to what address it has been possible to record data upon the optical disk (or, to express it in another manner, to ascertain the error occurrence address). For this reason, during recovery processing, in a state in which the error occurrence address is unclear, this BE control unit performs the recovery processing according to the error code.

Thus, with a prior art optical disk device, the possibility has been high that a failure may occur in the recovery processing, so that recording fails. To give a detailed example: if, with a DVD recorder, an error has occurred during recording of AV data, then, when recommencing recording of the next AV data from a recording possible seek destination region, the control data for the optical disk becomes inaccurate. Due to this, such a DVD recorder does not perform recovery processing, but instead fails in performing recording upon the optical disk. In particular since, with the DVD-Video format, the data is recorded in a single passage, accordingly the recovery processing fails and the recording stops. Even if the recording is temporarily recommenced, since the control data for the optical disk is inaccurate, after the recording has been completed, a state of affairs may come to pass in which it is not possible to replay the optical disk properly. Here by control data is meant the addresses and so on of the data recorded upon the optical disk.

Accordingly there is the problem with a prior art optical disk device that, irrespective of whether the user has commanded image recording or sound recording or whatever upon the optical disk, the possibility is high that image recording or sound recording or the like upon the hard disk will fail.

On the other hand, with the device described in the above identified Japanese Laid-Open Patent Publication 2001-160268, an error handling method is used when recording data upon the hard disk. Due to this, the context of that device is different from the context of recovery processing for not making an optical disk unusable. Accordingly, the above described problem cannot be solved with that device, by any means.

A feature of the present invention is to provide an optical disk device with which, when performing recovery processing, the recovery processing is performed using the error occurrence address, and with which the possibility of failure of recording upon the optical disk is reduced.

SUMMARY OF THE INVENTION

The optical disk device according to the present invention comprises a BE control means which issues requests for recording data to the optical disk. With this structure, this BE control means corresponds to the above described BE control unit.

Furthermore, this optical disk device comprises an FE processing means which receives the recording request from the BE control means, irradiates laser light from a pickup head upon the optical disk, and records data stored in a buffer memory upon the optical disk. With this structure, this FE processing means corresponds to the above described FE side processing section and FE control unit. Furthermore, the BE control means and the FE processing means are connected together according to a predetermined interface standard, so as to be capable of mutual communication. This predetermined interface standard may be, for example, ATAPI, ATA/ATAPI-4, or SCSI.

If an error has occurred during recording of data to the optical disk by the FE processing means, the BE control means performs control as follows:

(1) It acquires, from the FE processing means, error information including the error occurrence address at which this error has occurred, and an error code which indicates the type of this error;
(2) It determines, according to this error information, a re-recording address upon the optical disk, and a re-recording method for the optical disk; and
(3) It commands the FE processing means to perform re-recording, based upon this re-recording address and this re-recording method.

With this structure, in (1), the BE control means acquires the error information including the error occurrence address, and in (2) and (3) the BE control means performs recovery processing using this error information. In this manner, when performing recovery processing, the BE control means performs recovery processing by using the error occurrence address.

BRIEF DESCRIPTION OF THE DRAWINGS

FIGS. 5A through 5C are figures showing a concrete example of recovery processing performed by this optical disk device which is an embodiment of the present invention.

DETAILED DESCRIPTION OF THE INVENTION

In the following an optical disk device, which is an embodiment of the present invention, will be described.

Figure 1:
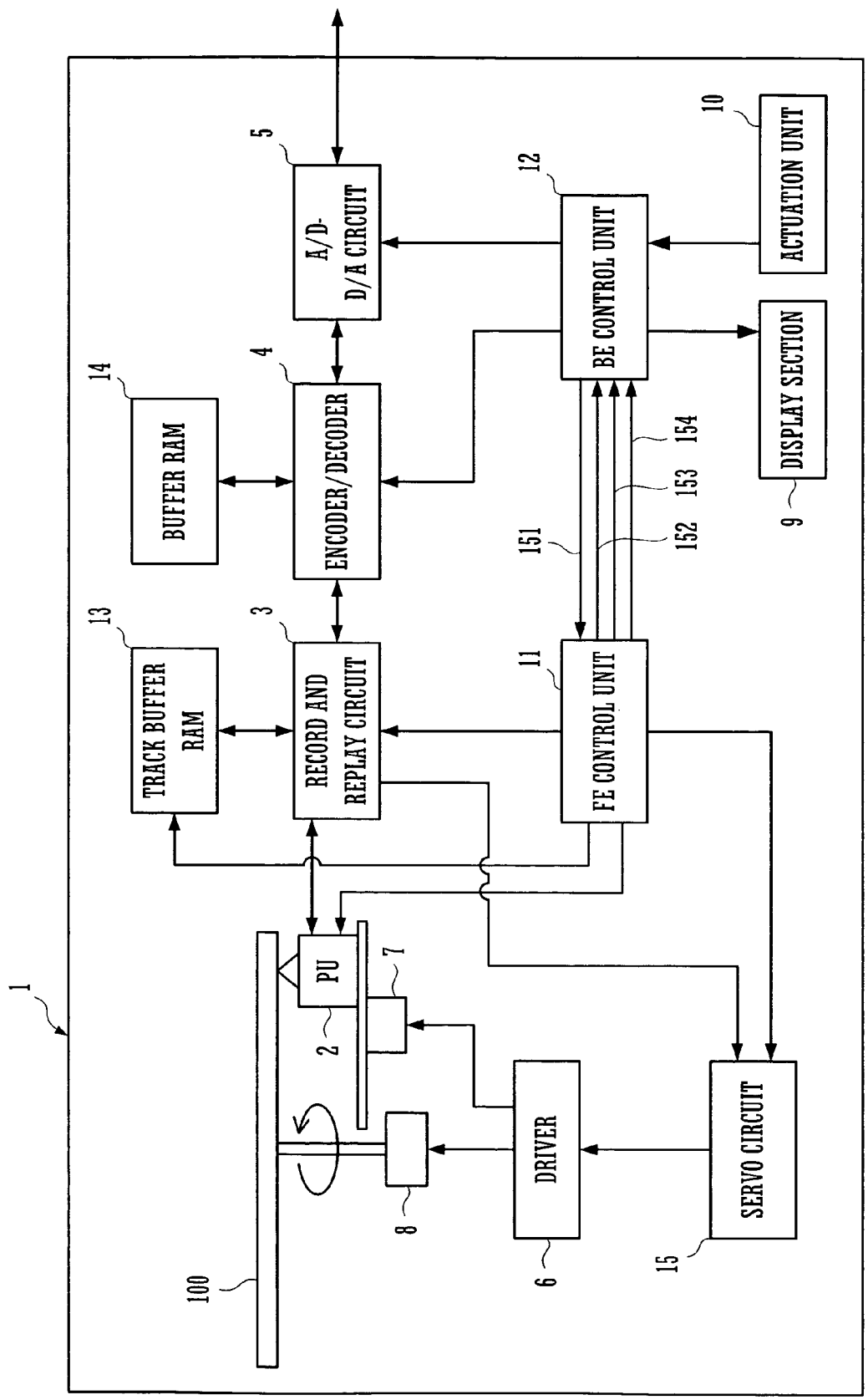
FIG. 1 is a block diagram of an optical disk device, which is an embodiment of the present invention.

FIG. 1 is a block diagram of this optical disk device which is an embodiment of the present invention.

This optical disk device 1 comprises a FE control unit 11 which controls a processing section at the front end (hereinafter abbreviated as "FE") side of the optical disk device 1, a BE control unit 12 which controls a processing section at the back end (hereinafter abbreviated as "BE") side of the optical disk device 1, a pickup head 2 (hereinafter abbreviated as the "PU head 2") which performs reading of data recorded upon the optical disk 100 and recording of data thereupon, a record and replay circuit 3 such as an RF amp or the like, a track buffer RAM 13 which stores AV (Audio Visual) data, a buffer RAM 14 which stores AV data, an encoder/decoder 4 which decodes data which is stored in the track buffer RAM 13 and encodes data which is stored in the buffer RAM 14, an A/D-D/A circuit 5 which performs D/A conversion and A/D conversion of AV data, a display section 9 which displays information, and an actuation unit 10 upon which a replay key and a record key are provided. Furthermore, this optical disk device 1 comprises a servo circuit 15 which generates a drive signal, a driver 6 which performs servo control, a thread motor 7 which drives the PU head 2 to seek, and a spindle motor 8 which drives an optical disk 100 to rotate. This optical disk device 1 is a so-called DVD recorder.

The above described structure may be divided into a front end side processing section which performs reading of data such as images or voice or the like which is recorded upon the optical disk 100 such as a CD or a DVD or the like, and a back end side processing section which outputs that data to the exterior of the device main body.

The BE side processing section of the optical disk device 1 corresponds to the encoder/decoder 4, the A/D-D/A circuit 5, the display section 9, and the actuation unit 10. This BE side processing section is controlled by the BE control unit 12.

And the FE side processing section of the optical disk device 1 corresponds to the PU head 2, the record and replay circuit 3, and the track buffer RAM 13. This FE side processing section is controlled by the BE control unit 11.

The FE control unit 11 and the BE control unit 12 may consist, for example, of microcomputers. Furthermore, the FE control unit 11 and the BE control unit 12 include ROMs which store control programs. Moreover, the FE control unit 11 and the BE control unit 12 are connected together according to the ATAPI interface standard. And, based upon control codes transmitted from the actuation unit 10, the BE control unit 12 controls the operation of the BE side processing section, and requests the FE control unit 11 to control the operation of the FE side processing section.

The PU head 2 comprises a laser diode (LD), a collimator lens, a beam splitter, an objective lens, a photodetector, and an actuator, none of which are shown in the figures.

The PU head 2 is fitted in a freely shiftable manner to a shaft which extends along the radial direction of the optical disk 100. The thread motor 7 shifts the PU head 2 in the radial direction of the optical disk 100.

The LD is a light source which outputs laser light. The photodetector is formed from a plurality of light receiving elements, and detects light reflected from the optical disk 100. The light receiving region of this photodetector may, for example, be divided almost equally into four portions, thus constituting four light receiving regions.

The objective lens adjusts the position upon the optical disk 100 upon which the laser light is irradiated. Furthermore, the actuator shifts the objective lens in the direction to move toward and away from the optical disk 100, and in the radial direction of the optical disk 100.

The servo control which is performed by the structure described above will now be explained in the following.

The servo circuit 15 generates a tracking servo signal for performing tracking adjustment and a focus servo signal for performing focus adjustment, respectively based upon a tracking error signal and a focus error signal which are provided by the record and replay circuit 3. Furthermore, the servo circuit 15 generates a thread motor drive signal which drives the thread motor 7, based upon a seek control signal which is inputted from the FE control unit 11, and outputs it to the driver 6.

The driver 6 drives the actuator within the PU head 2 and the thread motor 7, based upon the tracking servo signal, the focus servo signal, and the thread motor drive signal.

The thread motor 7 shifts (seeks) the PU head 2 in the radial direction of the optical disk 100, and changes the irradiation position of the laser light upon the optical disk 100.

The spindle motor 8 rotates the optical disk 100.

Next, the operation of the above described structure during replay will be explained in the following.

The PU head 2 irradiates laser light of read power upon the optical disk 100, and detects light reflected from the optical disk 100 with the photometer. By doing this, the data which is recorded upon the optical disk 100 is read out optically.

The record and replay circuit 3 generates and amplifies an RF signal based upon the outputs of the plurality of light receiving elements of the PU head 2, and processes this RF signal and extracts AV (Audio Visual) data from it. Here, the AV data which is extracted is encoded, for example by MPEG. And this AV data is temporarily stored in the track buffer RAM 13, awaiting a read out request from the back end control unit 12.

The AV data which is stored in the track buffer RAM 13 is read out in order according to a read out request from the back end control unit 12, and is transferred (outputted) to the encoder/decoder 4.

The encoder/decoder 4 decodes the AV data which is stored in the track buffer RAM 13. The decoded AV data, after having been temporarily stored in the buffer RAM 14, is again read out, and is transferred in order to the A/D-D/A circuit 5.

The A/D-D/A circuit 5 converts the AV data which has been expanded by the encoder/decoder 4 to an analog replay signal, and outputs this replay signal to the exterior.

Next, the operation of the above described structure during recording will be explained in the following.

During recording, the A/D-D/A circuit 5 receives a TV broadcast signal such as a TV broadcast or the like from an antenna (external to the optical disk device 1), digitizes it, and outputs it to the buffer RAM 14.

Here, when a digital signal has been inputted from outside the optical disk device 1 the A/D-D/A circuit 5 outputs this signal just as it is to the buffer RAM 14.

The encoder/decoder 4 encodes the AV data which has thus been digitized by the A/D-D/A circuit 5 (for example by MPEG), and stores it temporarily in the buffer RAM 13. At this time, the AV data is stored in the buffer RAM as a VOBU 1020 which have been packed and inserted, and to which a NV_PCK 1030 has been placed at the head (refer to FIGS. 2D and 2E which will be described hereinafter).

Here, in order to record the current VOBU upon the optical disk 100, the buffer RAM 13 maintains a plurality of other VOBUs (a maximum of two minutes of subsequent VOBU) recorded after the current VOBU. By this current VOBU is meant, when an attempt is newly made to record AV data, a VOBU including this AV data. Due to this, a discrepancy corresponding to the amount of delay in the buffer RAM 13 is present between the address of the data which the BE control unit 12 requests the FE control unit 11 to record, and the address of the data which is actually recorded by the PU head 2.

At a stage that the buffer RAM 13 can be maintained, the encoder/decoder 4 writes the leading addresses of the plurality of other VOBUs recorded after the current VOBU and the replay time of the cell and so on in the NV_PCK 1030 within the current VOBU. Moreover, the encoder/decoder 4 performs error detection and correction encoding, and outputs this data which has been encoded (which is a digital signal) to the record and replay circuit 3.

The record and replay circuit 3 supplies to the PU head 2 the digital signal which is supplied from the encoder/decoder 4.

Upon input of the digital signal from the record and replay circuit 3, the PU head 2 controls laser light of recording power according to this digital signal, and irradiates this light upon the recording surface of the optical disk 100.

The actuation unit 10 is a device for the user to input various types of command to the optical disk device 1. The commands which the user has inputted to the optical disk device 1 are supplied to the BE control unit 12.

The display section 9 displays the time, information which shows the operational state of the optical disk device 1, information related to the AV data during (image) recording, and the like.

Here, the FE control unit 11, the track buffer RAM 13, the record and replay circuit 3, and the PU head 2 correspond to the "FE processing means" of the Claims. Furthermore, the BE control unit 12 corresponds to the "BE control means" of the Claims. And the track buffer RAM 13 corresponds to the "buffer memory" of the Claims.

Figure 2:
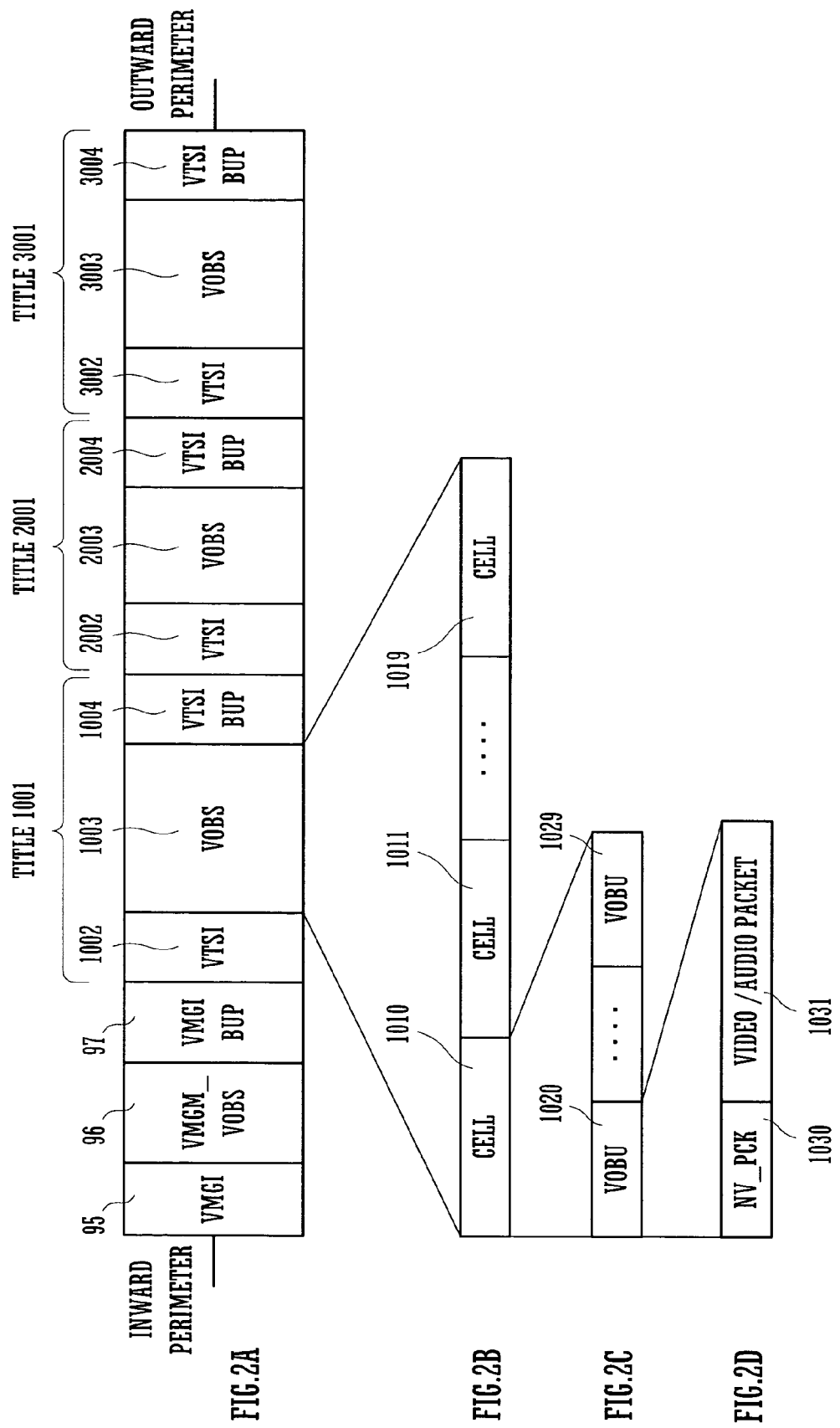
FIGS. 2A through 2D are figures showing the data structure of data upon an optical disk which has been recorded in the DVD-Video format.

FIG. 2 is a figure showing the data structure of data upon the optical disk which has been recorded in the DVD-Video format. As shown in FIG. 2, upon an optical disk 100 which has been recorded in the DVD-Video format, there are recorded, from its inner perimeter towards its outer perimeter, VMGI 95, VMGM_VOBS 96, VMGIbup 97, and titles 1001~3001.

In the VMGI (Video Manager Information) 95, there is written information related to replay of the entire DVD-Video (control information), and so called root menu information. For example, address information of the VTSI and the like may also be written here.

In the VMGM_VOBS (Video Object Set for VMG Menu) 96, there is written contents used by the title menu. Furthermore, sometimes information (control information) related to replay of the entire DVD-Video, including VTSI address information, is also written herein.

VMGIbup 97 is the backup file of VMGI 95.

In the following, when the term "VMG" is used, this means VMGI 95 or VMGM_VOBS 96.

Furthermore, a title 1001 is made up from a VTSI (Video Title Set Information) 1002, a VOBS (Video Object Set) 1003, and a VTSIbup (refer to FIG. 2A) 1004. In the DVD-Video format, a maximum of 99 titles can be recorded. In FIG. 2A, three titles are recorded.

In VTSI 1002, control information for this VTS is written.

In VOBS 1003, the contents for title replay are written. This VOBS 1003, as shown in FIG. 2B, is made up from a plurality of cells 1010~1019.

It should be understood that VOBS and VTS mean the same thing.

A backup file for VTSI 1002 is written in VTSIbup 1004.

In the DVD-Video format, the data is recorded by cell units which are determined in advance.

A cell 1010 consists of a plurality of VOBUs (Video Object Units) 1020~1029 (refer to FIG. 2C). The maximum number of cells in one title is 255 cells. Due to this, if for example 10 hours worth of data is recorded upon the optical disk, one cell is 2 minutes 30 seconds.

A NV_PCK (Navigation Pack) 1030 is placed at the head of the VOBU 1020, and, next, video data and audio data and so on are inserted in packized form (refer to FIG. 2D).

Here, in the recording of the current VOBU, it is necessary to write the leading addresses of the plurality of other VOBUs which are recorded after the current VOBU, and the replay time of their cells and so on, into the NV_PCK within the current VOBU.

In the DVD-Video format, the data is recorded, metaphorically, all in a single passage in order from its front. Due to this, in the DVD-Video format, it is not possible to perform editing after recording.

Figure 3:
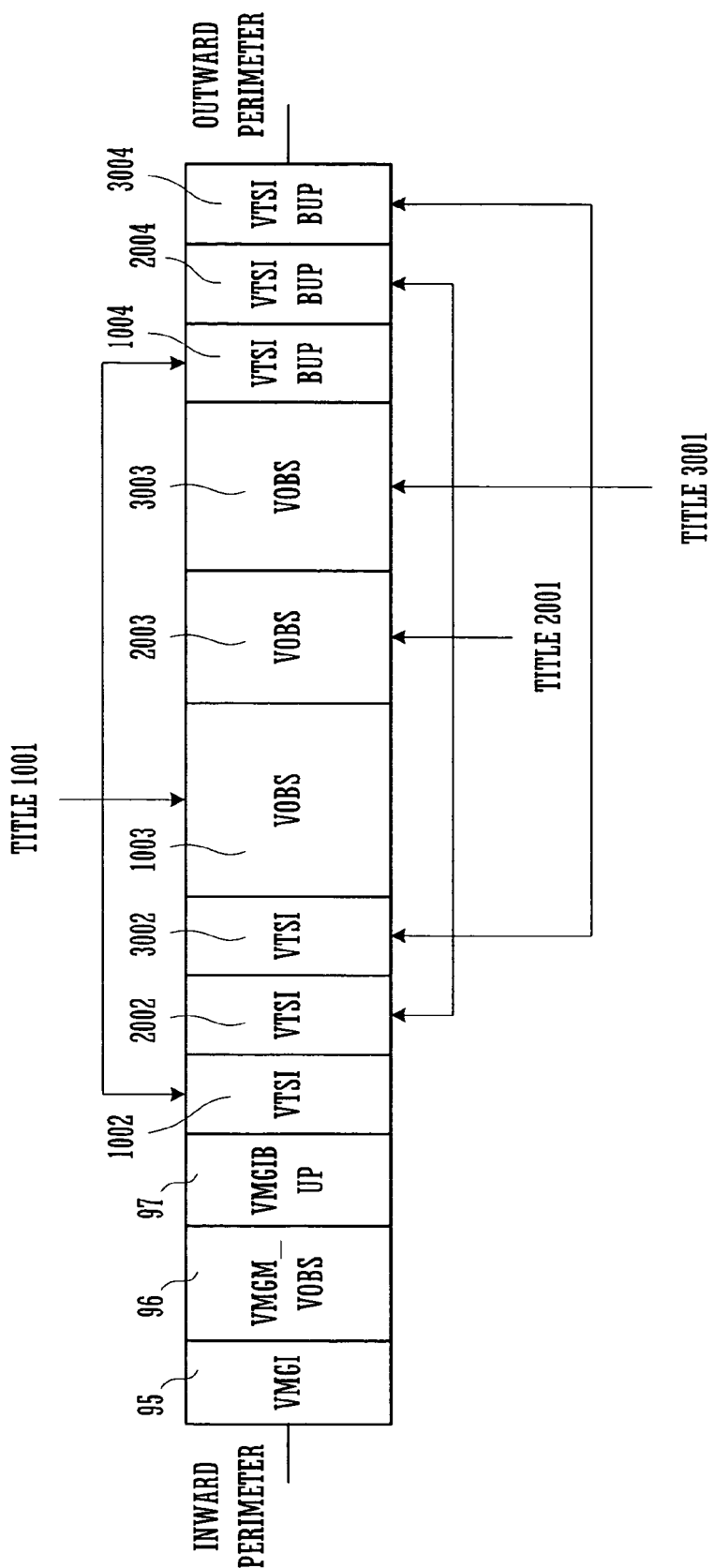
FIG. 3 is a figure showing the data structure of data upon an optical disk which has been recorded in the DVD+VR format.

FIG. 3 is a figure showing the data structure of data upon an optical disk which has been recorded in the DVD+VR format.

As shown in FIG. 3, when the data structure of data upon an optical disk 100 which has been recorded in the DVD+VR format is compared with the data structure of data upon an optical disk 100 which has been recorded in the DVD-Video format, they are the same with regard to the arrangement of the VMGI 95, VMGM_VOBS 96, and VMGIbup 97.

However, as shown in FIGS. 2A and 3, they differ with regard to the placement of the titles. While in FIG. 2A "VTSI, VOBS, and VTSIbup" constitute a set, in FIG. 3 they do not constitute any such set. In FIG. 3, each of "VTSI, VOBS, and VTSIbup" is arranged separately.

In the DVD+VR format, the data can be edited after it has been recorded.

It should be understood that although, in the DVD+VR format, the cells 1010~1019, the VOBUs 1020~1029, the NV_PCK 1030 and the video/audio pack 1031 are not shown in the figures, they are present, with the same structure as that of the data structure of the data upon an optical disk 100 which has been recorded in the DVD-Video format (refer to FIG. 2A).

Figure 4:
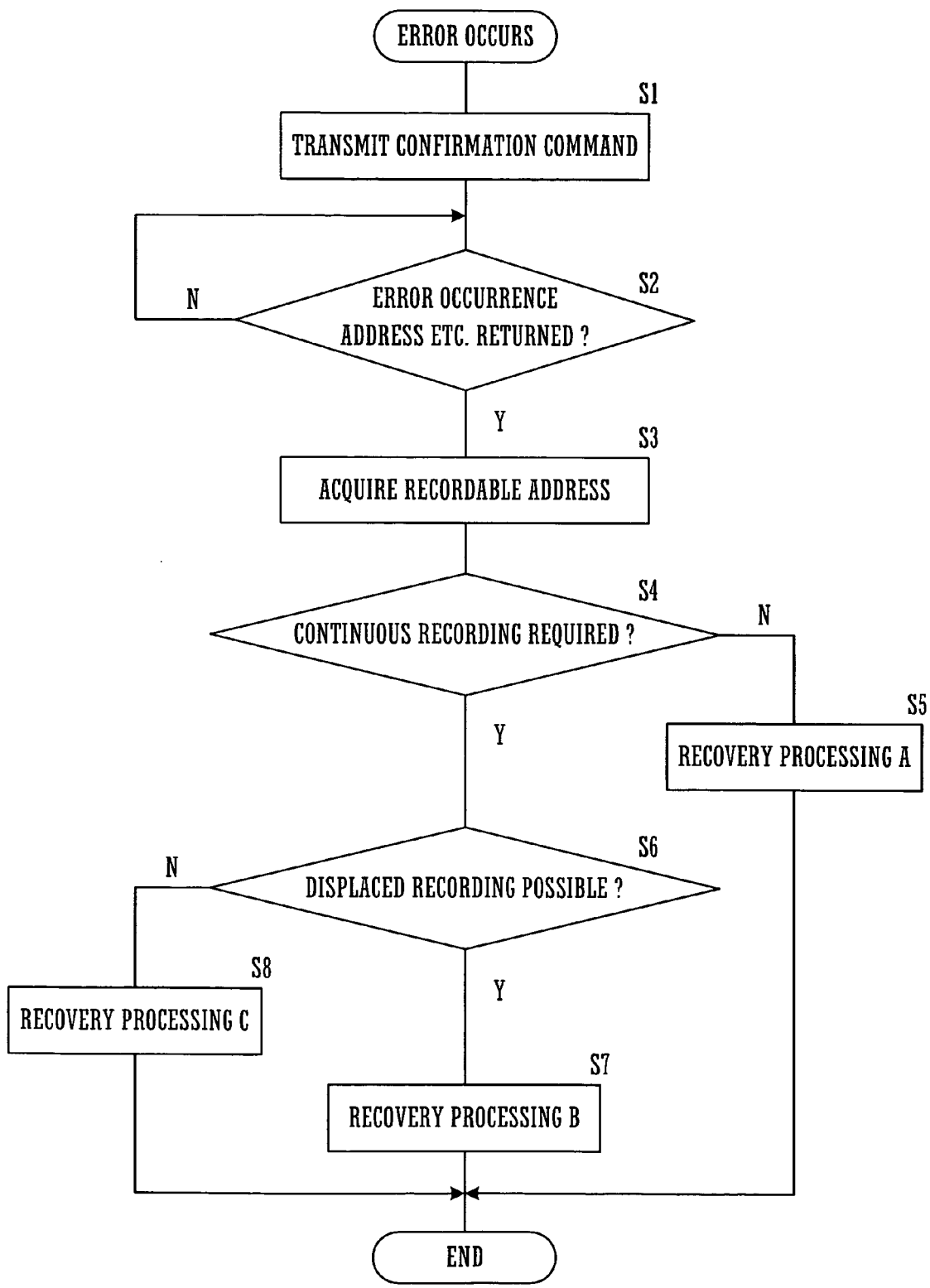
FIG. 4 is a flow chart showing the operations performed by a BE control unit when, with the optical disk device which is an embodiment of the present invention, an error has occurred.

FIG. 4 is a flow chart showing the operations performed by the BE control unit when an error has occurred during the operation of this optical disk device which is an embodiment of the present invention. The BE control unit 12 is always issuing a request for the recording of data to the FE control unit 11. Upon receipt of a recording request from the BE control unit, the FE control unit 11 commands the PU head 2 to record the data stored in the buffer RAM 13.

And, the FE control unit 11 makes a decision as to whether or not, during recording, an error has occurred. Here, an error occurs due to a defect condition. A defect condition is a state in which it is not possible to perform servo control in a normal manner, since damage or dirt or the like is present upon the recording surface of the optical disk. This decision as to whether or not an error has occurred is performed by the FE control unit 11 testing the waveform of the RF signal or of the FE signal.

Furthermore, during the recording, the FE control unit 11 confirms whether or not the PU head 2 is actually able to record the data. This confirmation is performed by the FE control unit 11 testing the RF signal. Due to this, when an error occurs, the FE control unit 11 is able to be apprised of the error occurrence address from the non-recorded data stored in the buffer RAM 13, and the RF signal.

And, if an error has occurred during the recording of the data upon the optical disk 100, the FE control unit 11 temporarily interrupts the recording. And the FE control unit 11 does not reply to the recording request from the BE control unit 12.

When the FE control unit 11 does not respond to the recording request, the BE control unit 12 transmits to the FE control unit 11 a confirmation command (refer to the line 151 in FIG. 1) which confirms what type of error has occurred (step S1). This confirmation command is SENS_REQUEST, since the FE control unit 11 and the BE control unit 12 are connected together by ATAPI.

Upon receipt of this confirmation command, the FE control unit 11 transmits an error code (refer to the line 152 in FIG. 1) according to the ATAPI standard to the BE control unit 12. In addition, the FE control unit 11 transmits the error occurrence address (refer to the line 153 in FIG. 1) acquired when the error occurred to the BE control unit 12. Here, this error code is a code which indicates the type of error that has occurred. Furthermore, this error occurrence address is the address upon the optical disk 100 where the error has occurred.

Since, according to the above, the BE control unit 12 is able to acquire the error occurrence address when an error has occurred, accordingly it is able to perform the following recovery processes A through C, using this error occurrence address.

When the BE control unit 12 receives the error occurrence address and the error code (step S2), it commands the FE control unit 11, and acquires a recordable address (step S3) (refer to the line 154 in FIG. 1). A recordable address is the leading address of a non-recorded region upon which recording is possible, on a perimeter further outwards than the error occurrence address. To explain this in detail, upon receipt of the command from the BE control unit 12, the FE control unit 11 seeks, with the PU head 2, for a region upon which stabilized recording is possible, and acquires its recordable address. And the FE control unit 11 transmits this recordable address to the BE control unit 12. This acquisition of a recordable address is performed by seeking the PU head 2, for example from the error occurrence address, while irradiating laser light of read power upon the optical disk 100, and by observing the RF signal (the electrical signal). Since a region upon which nothing is recorded is flat with no pits formed upon it, the FE control unit 11 searches for this type of position.

The BE control unit 12 performs recovery processing according to the error information, which includes the recordable address which has been acquired by the above processing, and the error code and the error occurrence address. In concrete terms, in the steps S4 and S6 which will be described hereinafter, the BE control unit 12 determines a re-recording address upon the optical disk 100 and a re-recording method for the optical disk 100. And, in the steps S5, S7, and S8 which will be described hereinafter, the BE control unit 12 commands the FE control unit 11 to perform re-recording of the data, based upon that re-recording address and that re-recording method.

FIGS. 5A through 5C are figures showing a concrete example of recovery processing of an optical disk device which is an embodiment of the present invention. The positions 101, 201, and 301 upon the optical disk 100 in FIGS. 5A through 5C are the error occurrence addresses. Furthermore, the positions 102, 202, and 302 upon the optical disk 100 in FIGS. 5A through 5C are the re-recording addresses at which the recording recommences.

FIG. 5A shows that, during the recording of video/audio pack 1031, an error has occurred at an intermediate position 101 of a video/audio pack 1031, and shows the re-recording address in this case (refer to the position 102 in FIG. 5A). Here, the region from the position 101 to the position 102 in FIG. 5A is one in which it is not possible for the PU head 2 to record data upon the optical disk 100, and this figure shows a situation in which the AV data of the video/audio pack 1031 is broken off partway through. Furthermore, the NV_PCK 1030 in FIG. 5A shows that the PU head 2 was able to record upon the optical disk 100.

FIG. 5B shows that, during the recording of the VTSI 1002, an error has occurred at an intermediate position 201 of this VTSI 1002, and specifies a re-recording address in this case (refer to the position 202 in FIG. 5B). Here, the optical disk 100 of FIG. 5B is a DVD+RW. Furthermore, in FIG. 5B, the data is recorded upon the optical disk 100 in the DVD+VR format (refer to FIG. 3).

FIG. 5C shows that, during the recording of the VTSI 1002, an error has occurred at an intermediate position 301 of this VTSI 1002, and specifies a re-recording address in this case (refer to the position 302 in FIG. 5C). Here, the optical disk 100 of FIG. 5C is a DVD-RW or a DVD+RW. Furthermore, in FIG. 5C, the data is recorded upon the optical disk 100 in the DVD-Video format (refer to FIG. 2).

By the way, with a prior art optical disk device, when an error like those shown in FIGS. 5A through 5C has occurred, the recording upon the optical disk 100 fails, since the BE control unit 12 does not know the error occurrence addresses 101, 201, 301. To explain this in concrete terms with reference to FIG. 5A as a representative for FIGS. 5A through 5C, when recommencing recording of the subsequent AV data from the recordable address, the control data of the optical disk becomes inaccurate. Due to this, with a prior art optical disk device, it is not possible to perform recovery processing, and recording upon the optical disk fails.

Thus, with this optical disk device 1, when an error like those shown in FIGS. 5A through 5C has occurred, the recovery processes A through C are performed based upon the error occurrence address, and thus the possibility that recording upon the optical disk 100 may fail is reduced.

The BE control unit 12 makes a decision as to whether or not the data which it will attempt to re-record is data which needs to be continuously recorded (the step S4). In other words, in this step S4, if the data from the error occurrence address to the recordable address is not recorded upon the optical disk 100, then the BE control unit 12 makes a decision as to whether or not it will be impossible to replay the optical disk 100 after recording has been completed. Data which needs to be recorded upon the optical disk 100 continuously is, for example, control data. Such control data is, for example, a VTSI. The BE control unit 12 decides, from the error occurrence address, whether or not the data when the error occurred is control data.

If, in the step S4, it is decided that the data which it is being attempted to re-record is not data which needs to be recorded continuously, then the BE control unit 12 performs the recovery process A (the step S5), and then terminates this processing. Now, the recovery process A will be explained using FIG. 5A. First, the BE control unit 12 determines the recordable address as the re-recording address (refer to the position 102 in FIG. 5A). Furthermore, the BE control unit 12 determines abandoning the data from the error occurrence address 101 to the recordable address 102 and re-recording the data, from the recordable address 102, following on from the data which has been abandoned, as being the re-recording method. And the BE control unit 12 commands the FE control unit 11 to perform re-recording of the data, based upon the re-recording address 102 and this re-recording method (refer to the position 102 of FIG. 5A).

Due to this, when replay is performed after all recording has been completed, the phenomenon may occur that, in the region from the position 101 to the position 102 in FIG. 5A, the image may become discontinuous, or the like. However there is no influence upon the replaying of the optical disk 100, since the image is restored after the re-recording address 102.

On the other hand, if in the step S4 it is decided that the data which it is being attempted to re-record is data which needs to be recorded continuously, then the BE control unit 12 makes a decision as to whether or not it is possible to record the data from the error occurrence address to the recordable address in a displaced manner (the step S6). The case of it being possible to record the data between these two addresses upon the optical disk 100 in a displaced manner, is the case when the data is being recorded in the DVD+VR format.

If it is decided that it is possible to record the data from the error occurrence address to the recordable address in a displaced manner, then the BE control unit 12 performs the recovery process B (the step S7), and then terminates this processing. Now, the recovery process B will be explained using FIG. 5B. First, the BE control unit 12 determines the recordable address as the re-recording address (refer to the position 202 in FIG. 5B). Furthermore, the BE control unit 12 treats the VTSI 1002 up to the error occurrence address 201 as ineffective data, and moreover determines re-recording the VTSI 1002 from the recordable address 202 from the beginning, as being the re-recording method. And the BE control unit 12 commands the FE control unit 11 to perform re-recording of the data, based upon the re-recording address 202 and this re-recording method (refer to the position 202 of FIG. 5B). If necessary, the BE control unit 12 commands the FE control unit 11 to correct (update) the control data related to the VTSI 1002 in the VMG.

It should be understood that although, in this embodiment, this recovery processing has been explained for the case that an error has occurred during the recording of the VTSI 1002 in the step S7, the processing is the same for the case that an error has occurred while recording the NV-PCK 1030. In this case, the control data in the VTSI related to the NV_PCK 1030 is corrected.

On the other hand, if it is decided that the data from the error occurrence address to the recordable address is data which cannot be recorded in a displaced manner, then the BE control unit performs the recovery process C (the step S8), and then terminates this processing. Now, the recovery process C will be explained using FIG. 5C. In this recovery process C, the BE control unit 12 determines the error occurrence address 301 as the re-recording address (refer to the position 302 in FIG. 5C). Furthermore, the BE control unit 12 determines re-recording from the data continuing on from the VTSI 1002, at the error occurrence address 301, as being the re-recording method. The reason is because it is not possible to record data in a displaced manner in the DVD-Video format. And the BE control unit 12 commands the FE control unit 11 to perform re-recording of the data, based upon the re-recording address 302 and this re-recording method (refer to the position 302 of FIG. 5C).

According to the above, it is possible to employ the recovery processes A~C by using the error occurrence address. Accordingly, as compared with the case of a prior art optical disk device in which it was not possible to employ these recovery processes A~C, it is possible to reduce the possibility of recording upon the optical disk 100 failing.

It should be understood that although, in the embodiment of the present invention described above, the above described recovery processes A through C were performed according to the recordable address, the error code, and the error occurrence address, the recovery processing using the error occurrence address is not limited to the above described recovery processes A through C. In other words, the above described recovery processes A through C are an example of recovery processing using the error occurrence address.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An optical disk device, comprising:
   a back end control means which issues a request for recording of data upon an optical disk; and
   a front end processing means which receives the recording request from the back end control means, irradiates laser light from a pickup head upon the optical disk, and records data stored in a buffer memory upon the optical disk;
   wherein if an error has occurred during the recording of the data upon the optical disk by the front end processing means, the front end processing means transmits to the back end control means, error information including an error occurrence address at which the error has occurred, an error code which indicates a type of the error, and a recordable address which is the leading address of the non-recorded recordable region in the perimeter outwards from the error occurrence address, wherein when acquiring the error information from the front end processing means, the back end control means decides whether data of the error occurrencd address is audio visual data or control data which shows address of the audio visual data, wherein when deciding that the data of the error occurrence address is the audio visual data, the back end control means commands the front end processing means, as recovery processing, abandon audio visual data corresponding to a part on the optical disk, ranging from the error occurrence address to the recordable address, and to resume recording at the recordable address from audio visual data continuing from the abandoned data, and wherein when deciding that the data of the error occurrence address is the control data, the back end control means commands the front end processing means, as recovery processing, to perform either one of a first and second processing, the first processing for resuming recording at the recordable address from the beginning of the control data involving the data of the error occurrence address, and the second processing for resuming recording at the error occurrence address from the data of the error occurrence address.

2. An optical disk device as described in claim 1, wherein:

the back end control means and the front end processing means are capable of mutual communication;

if an error has occurred during the recording of the data upon the optical disk by the front end processing means, the back end control means transmits to the front end processing means a confirmation command which confirms what type of error has occurred; and the front end processing means, upon receipt of the confirmation command, transmits the error information to the back end control means, and thereby the back end control means acquires the error information.

3. An optical disk device as described in claim 1, wherein:

the front end processing means records data stored in the buffer memory upon the optical disk, in DVD-Video format; and after occurrence of error, when deciding that the data of the error occurrence address is the control data, the back end control means commands the front end processing means, as recovery processing, to perform the second processing for resuming recording at the error occurrence address from the data of the error occurrence address.

* * * * *